(12) United States Patent
Haschick et al.

(10) Patent No.: US 7,769,710 B2
(45) Date of Patent: Aug. 3, 2010

(54) METHOD AND SYSTEM FOR EXTRACTING DATA RECORDS FROM DATABASES USING QUERIES BASED ON OFFSET PARAMETERS

(75) Inventors: Frank Haschick, Dresden (DE); René Pfeiffer, Dresden (DE)

(73) Assignee: SAP AG, Walldorf (DE)

( * ) Notice: Subject to any disclaimer, the term of this patent is extended or adjusted under 35 U.S.C. 154(b) by 345 days.

(21) Appl. No.: 11/845,108

(22) Filed: Aug. 27, 2007

(65) Prior Publication Data
US 2009/0063407 A1    Mar. 5, 2009

(51) Int. Cl.
*G06F 17/00* (2006.01)
*G06F 7/00* (2006.01)

(52) U.S. Cl. ........................................................ 707/602
(58) Field of Classification Search ....................... None
See application file for complete search history.

(56) References Cited

U.S. PATENT DOCUMENTS 6,256,624 B1 *   7/2001   Pollard et al. ........................ 1/1

* cited by examiner

*Primary Examiner*—Uyen T. Le

(57) ABSTRACT

A method and system for generating data reports are provided. An offset parameter is received. A reporting length is determined from the offset parameter. A query is executed based upon the reporting length. A data record is extracted from a database based upon the query.

14 Claims, 4 Drawing Sheets

METHOD AND SYSTEM FOR EXTRACTING DATA RECORDS FROM DATABASES USING QUERIES BASED ON OFFSET PARAMETERS

TECHNICAL FIELD

Embodiments of the invention generally relate to computer systems, and more particularly to a method and system for generating data reports.

BACKGROUND

One of the primary uses of computers is for information storage and retrieval. Database systems have been developed that allow a computer to store a large amount of information in a way that allows a user to search for specific information in the database, retrieve such specific information and generate reports to enable analysis of the information. For example, an insurance company may have a database that includes all of its policy holders and their current account information, including payment history, premium amount, policy number, policy type, exclusions to coverage, etc. A database system allows the insurance company to retrieve the account information for one or more policy holders among the thousands and perhaps millions of policy holders in its database and generate reports based upon specific user parameters.

Applications have been developed that enable the user to retrieve specific information from the database and generate reports based upon the user requirements. To generate a desired report using the current applications the user typically must browse through multiple user interface screens specifying multiple user parameters in each page. This is a tedious and time consuming process requiring considerable effort from the user especially when the application is slow due to poor bandwidth.

Thus, there is a need for an application that may automatically retrieve information from the database and generate the desired reports.

SUMMARY OF THE INVENTION

Embodiments of the invention are generally directed to a method and system for generating data reports. An offset parameter is received. A reporting length is determined from the offset parameter. A query is executed based upon the reporting length. A data record is extracted from a database based upon the query.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention are generally directed to a method and system for generating data reports. An offset parameter is received. A reporting length is determined from the offset parameter. A query is executed based upon the reporting length. A data record is extracted from a database based upon the query.

Figure 1:
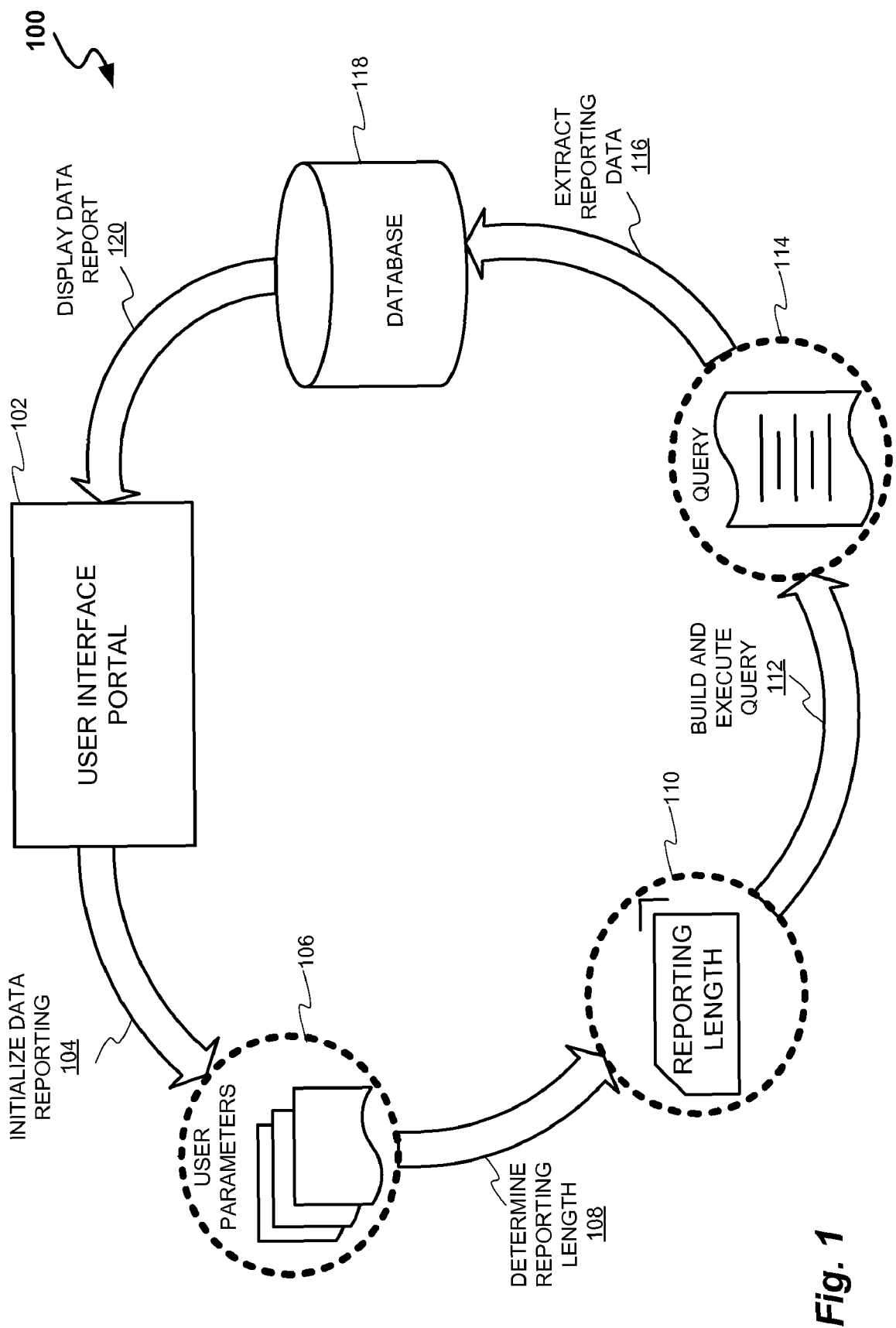
FIG. 1 is a functional block diagram of a system for generating data reports according to an embodiment of the invention.

FIG. 1 is a functional block diagram of a system 100 for generating data reports according to an embodiment of the invention. User interface portal 102 acts as an interface between a user and system 100 enabling the user to interact with system 100. User interface portal 102 typically provides the user with one or more options to initialize data reporting 104 by providing a reporting request. The options may include a hyperlink on a web page, a push button, a drop down menu option and the like. The user may provide user parameters 106 using user interface portal 102 based upon which reporting data may be extracted from database 118. For example, if the user must retrieve the time spent by a set of employees in an organization on business activities for the past eight weeks, the user may provide one or more organizational units within the organization for which the employees work, the format for the display of dates and times, the sorting order of the reporting data results and the like as user parameters 106. User parameters 106 typically include an offset parameter. The offset parameter typically is a numeric value. Reporting length 110 is determined 108 using the offset parameter. Reporting length 110 typically defines a number of data records that must be extracted from database 118. According to an embodiment, reporting length 110 is determined by multiplying the offset parameter provided by the user by a constant numeric value. In the above example system 100 may be configured to accept the offset parameter with a value of the offset parameter defining the number of weeks for which the user wants the data reports to be generated. As the user must generate the data report for eight weeks, the user may provide an offset parameter with a value of eight. Database 118 typically stores the data records for each employee on a day to day basis with each data record in database 118 storing the time spent by the employee on business activities in a single day. As one week consists of seven days, forty eight data records must be extracted from database 118 for each of the employees to generate a data report indicating the time spent by each of the employees over forty eight days. Thus system 100 may be configured to multiply the offset parameter by a constant numeric value of seven to determine reporting length 110, which is the number of data records that must be extracted from database 118. The definition of the offset parameter and reporting length 110 may vary depending upon use cases and the nature of reports required. According to an embodiment, the definition of the offset parameter and reporting length 110 may be configured by the user at runtime or design time.

Query 114 is built and executed 112 based upon reporting length 110. Query 114 typically is a procedure that is executed to extract one or more data records from database 118 based upon search criteria. Query 114 typically includes an input parameter node and a result node. The input parameter node stores the search criteria provided by the user by way of user parameters and the result node stores one or more data records extracted from database 118. One or more of user parameters 106 and reporting length 110 is accepted by the input parameter node of query 114 as input parameters. One or more data records are extracted 116 from database 118 based upon the input parameters and stored in the result node. Finally, the extracted data records are formatted according to the user requirements and a data report is displayed 120 to the user on user interface portal 102.

Figure 2:
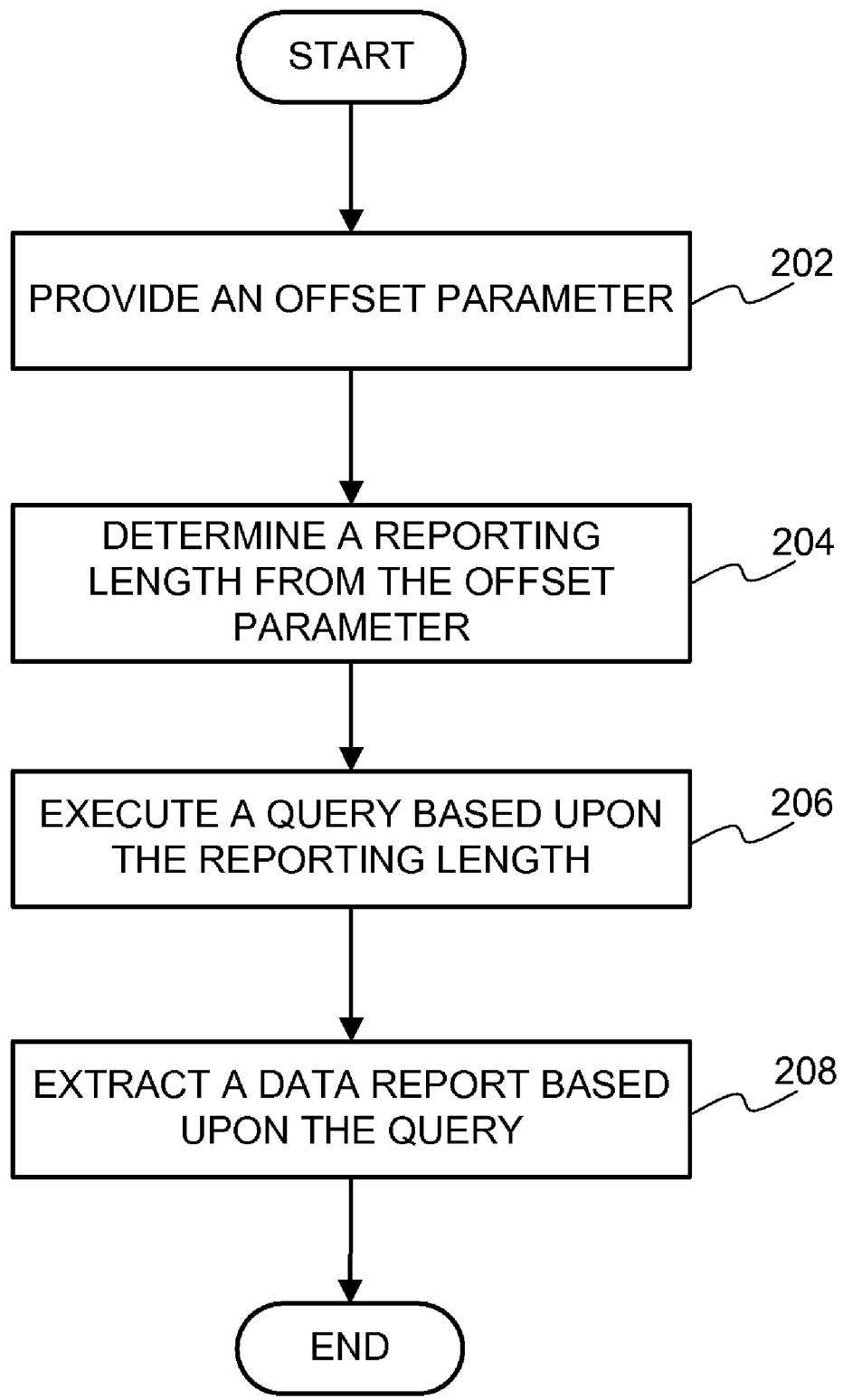
FIG. 2 is a flow diagram of a process for generating data reports according to an embodiment of the invention.

FIG. 2 is a flow diagram of a process for generating data reports according to an embodiment of the invention. In process block 202 an offset parameter is provided. The offset parameter may be provided by a user using a user interface portal or configured by the user during design time. In process block 204, a reporting length is determined from the offset parameter. The reporting length is typically determined by multiplying the offset value by a constant numeric value. In process block 206 a query is executed based upon the reporting length. The query typically takes one or more user parameters provided by the user and the reporting length as input parameters. In process block 208, a data record is extracted based upon the query. Typically executing the query extracts one or more data records from a database based upon the input parameters. The extracted data records are saved as a result in a result node of the query.

Figure 3:
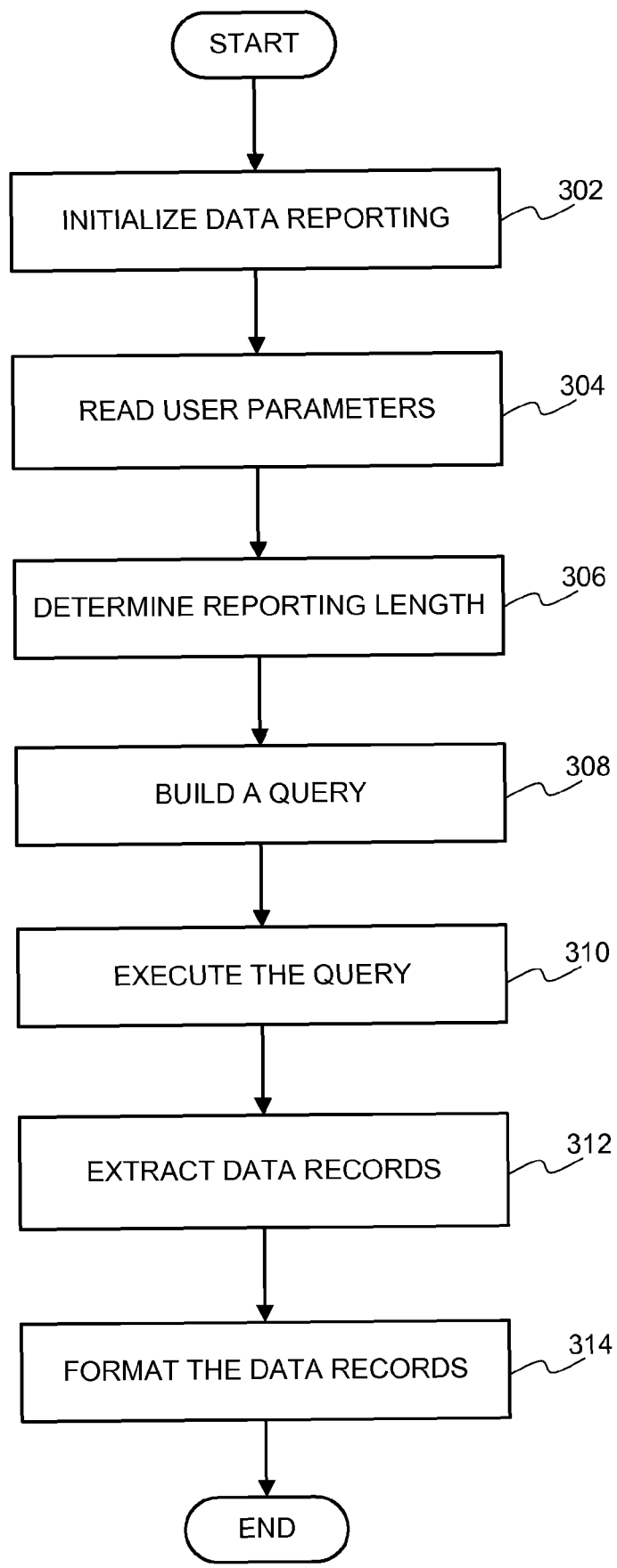
FIG. 3 is a flow diagram of a process for generating data reports according to an embodiment of the invention.

FIG. 3 is a flow diagram of a process for generating data reports according to an embodiment of the invention. In process block 302, a data reporting is initialized in a system. The data reporting may be initialized by a user through a user interface portal. The data reporting may also be initialized automatically based upon events such as at the end of each week or month. The events upon which data reporting may be initialized may be configured by the user. The user may initialize the data reporting on the user interface portal by clicking a push button, selecting a menu option, selecting a hyperlink on a webpage and the like. In process block 304, one or more user parameters are read by the system. The user parameters may be provided by the user using the user interface portal or configured by the user during design time. The user parameters typically include an offset parameter. The offset parameter typically is a numeric value. In process block 306, a reporting length is determined from the offset parameter. The reporting length is typically determined by multiplying the offset parameter by a constant numeric value. The reporting length generally defines the number of records that must be extracted from a database. In process block, 308 a query is built. The query is used to extract one or more data records from the database based upon a search criteria provided by the user. The query typically includes an input parameter node and a result node. The input parameter node accepts one or more of the user parameters and the reporting length as input parameters. The result node stores the data records extracted from the database based upon the input parameters. In process block 310, the query is executed. Executing the query typically includes searching the database for one or more data records based upon the input parameters. In process block 312, data records are extracted from the database. The data records are extracted as a result of executing the query. The extracted data records are typically saved in the result node of the query. In process block 314, the data records extracted as a result of executing the query are formatted based upon user requirements. The formatted data records are then displayed to the user typically through the user interface portal as a data report.

Figure 4:
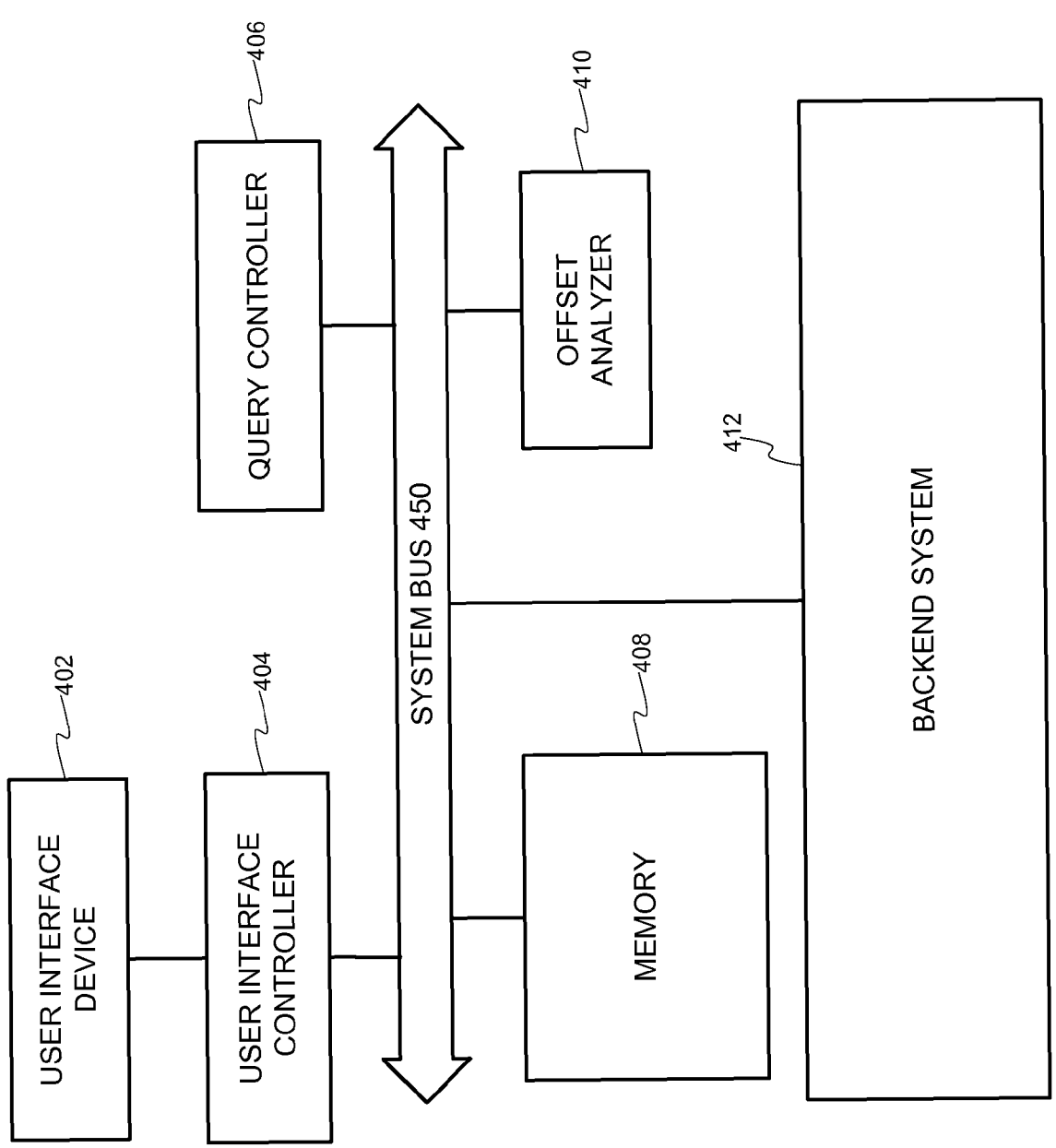
FIG. 4 is a block diagram of a system for generating data reports useful for implementing the invention according to an embodiment of the invention.

FIG. 4 is a block diagram of a system 400 for generating data reports useful for implementing the invention according to an embodiment of the invention. System 400 includes user interface device 402, user interface controller 404, query controller 406, memory 408, offset analyzer 410 and backend system 412 all connected to each other by system bus 450.

User interface device 402 acts as an interface between a user and system 400 enabling the user to interact with system 400. User interface device 402 typically provides the user with one or more options to initialize data reporting by providing a reporting request. The options may include a hyperlink on a web page, a push button, a drop down menu option and the like. The user may provide one or more user parameters using user interface device 402 based upon which reporting data may be extracted from a database. The database is typically stored in backend system 412. The user parameters typically include an offset parameter. The offset parameter is generally a numeric value. The user parameters including the offset parameter are typically stored in memory 408. Offset analyzer 410 determines a reporting length using the offset parameter. The reporting length typically defines a number of data records that must be extracted from the database. According to an embodiment, the reporting length is determined by multiplying the offset parameter provided by the user by a constant numeric value. The definition of the offset parameter and the reporting length may vary depending upon use cases and the nature of reports required. According to an embodiment, the definition of the offset parameter and the reporting length may be configured by the user at runtime or design time.

Query controller 406 builds a query based upon the reporting length. The query is used to extract one or more data records from the database based upon a search criteria provided by the user. The search criteria are typically provided by the user by way of the user parameters. The query typically includes an input parameter node and a result node. Building the query includes the input parameter node accepting one or more of the user parameters and the reporting length as input parameters. The result node stores the data records extracted from the database based upon the input parameters. After building the query, query controller 406 executes the query. Executing the query typically includes searching the database for one or more data records based upon the input parameters. As a result of executing the query, the data records are extracted from the database by query controller 406 and typically stored in memory 408. The data records are formatted by user interface controller 404 based upon user requirements. The formatted data records are then displayed to the user as a data report typically by user interface device 402.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, the invention may be downloaded as a computer program which may be transferred from a remote computer (e.g., a server) to a requesting computer (e.g., a client) via a communication link (e.g., a modem or network connection).

What is claimed is:

1. A computerized method comprising:
   receiving an offset parameter via user input;
   determining a number of records to extract from a database based on a reporting length parameter and the offset parameter, wherein the number of records to extract from the database is obtained by multiplying a value of the reporting length parameter with a value of the offset parameter;
   executing a query in the database with the reporting length parameter and the offset parameter as input parameters;
   extracting a data record from the database based on the query; and
   saving the data record to a memory; and
   displaying a data report including the data record to a user on a user interface portal.

2. The computerized method of claim 1, wherein the offset parameter comprises a user parameter.

3. The computerized method of claim 1, wherein determining the reporting length parameter further comprises multiplying the offset parameter by a constant numeric value.

4. The computerized method of claim 1 further comprising formatting the data report.

5. The computerized method of claim 1, further comprising receiving a reporting request from the user interface portal.

6. A computerized system including a hardware platform, the hardware platform communicating with one or more memory devices storing instructions, the instructions comprising:
   storing an offset parameter in the one or more memory devices, wherein the offset parameter is received via user input;
   an offset analyzer electronically coupled to the one or more memory devices, wherein the offset analyzer is configured to determine a number of records to extract from a database based on a reporting length parameter and the offset parameter, wherein the number of records to extract from the database is obtained by multiplying a value of the reporting length parameter with a value of the offset parameter; and
   a query controller electronically coupled to the one or more memory devices and the offset analyzer, wherein the query controller is configured to:
      execute a query in the database with the reporting length parameter and the offset parameter as input parameters;
      extract a data record from the database based on the query; and
      save the data record the one or more memory devices.

7. The computerized system of claim 6 further comprising a user interface device electronically coupled to the one or more memory devices, the offset analyzer and the query controller, wherein the offset parameter is received from the user interface device and stored in the one or more memory devices, wherein the user interface device is configured to display a data report including the data record to a user on a user interface portal.

8. The computerized system of claim 7 further comprising a user interface controller electronically coupled to the one or more memory devices, the offset analyzer, the user interface device and the query controller formatting the data report.

9. The computerized system of claim 6 further comprising a backend system comprising the database and electronically coupled to a user interface device, a user interface controller, the query controller, and the one or more memory devices.

10. A machine-readable medium having machine-executable instructions tangibly stored thereon which when executed by the machine, cause the machine to perform a method for extracting data records from a database using queries based on offset parameters, the method comprising:
    receiving an offset parameter via user input;
    determining a number of records to extract from the database based on a reporting length parameter and the offset parameter, wherein the number of records to extract from the database is obtained by multiplying a value of the reporting length parameter with a value of the offset parameter;
    executing a query in the database with the reporting length parameter and the offset parameter as input parameters;
    extracting a data record from the database based on the query;
    saving the data record to a memory; and
    displaying a data report including the data record to a user on a user interface portal.

11. The machine-readable medium of claim 10, wherein the offset parameter comprises a user parameter.

12. The machine-readable medium of claim 10, wherein determining the reporting length parameter further comprises multiplying the offset parameter by a constant numeric value.

13. The machine-readable medium of claim 10 wherein the method further comprises formatting the data report.

14. The machine-readable medium of claim 10 wherein the method further comprises receiving a reporting request from the user interface portal.

* * * * *